United States Patent
Carnicero et al.

(10) Patent No.: US 11,301,802 B1
(45) Date of Patent: Apr. 12, 2022

(54) SYSTEM FOR FACILITATING RETURNS OF ITEMS

(71) Applicant: AMAZON TECHNOLOGIES, INC., Seattle, WA (US)

(72) Inventors: Santiago Carnicero, Madrid (ES); Davide Giannico, Madrid (ES); Abdulkerim Bugra Cavdar, Madrid (ES); Ignacio Molina Casquero, Madrid (ES); Jose Camacho Vargas, Leganes (ES)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 558 days.

(21) Appl. No.: 16/130,159

(22) Filed: Sep. 13, 2018

(51) Int. Cl.
*G06Q 10/08* (2012.01)
*G06Q 30/06* (2012.01)
*G06Q 20/40* (2012.01)

(52) U.S. Cl.
CPC ....... *G06Q 10/0837* (2013.01); *G06Q 10/087* (2013.01); *G06Q 20/407* (2013.01); *G06Q 30/0631* (2013.01); *G06Q 30/0633* (2013.01)

(58) Field of Classification Search
CPC ............. G06Q 10/0837; G06Q 10/087; G06Q 20/407; G06Q 30/0631; G06Q 30/0633
See application file for complete search history.

(56) References Cited

U.S. PATENT DOCUMENTS

| | | | |
|---|---|---|---|
| 2013/0041791 A1* | 2/2013 | Thompson | G06Q 20/10 705/30 |
| 2015/0088781 A1* | 3/2015 | Gillen | G06Q 10/083 705/340 |
| 2017/0364860 A1* | 12/2017 | Wilkinson | G06Q 10/0837 |
| 2018/0349918 A1* | 12/2018 | Han | G06Q 10/0837 |
| 2019/0007381 A1* | 1/2019 | Isaacson | G06Q 50/01 |
| 2019/0026819 A1* | 1/2019 | Miyagi | G06Q 30/0633 |
| 2019/0080392 A1* | 3/2019 | Youb | G06F 21/64 |
| 2019/0114584 A1* | 4/2019 | Toohey | G06K 19/07758 |
| 2020/0226632 A1* | 7/2020 | Khan | G06Q 30/0226 |
| 2021/0045640 A1* | 2/2021 | Poltorak | A61B 5/369 |

OTHER PUBLICATIONS

Oracle Retail Point-of-Service User Guide, Release 12.0, available at: https://docs.oracle.com/cd/E10650_01/pdf/120/pos-120-ug.pdf; last accessed Dec. 6, 2021 (Year: 2007).*

* cited by examiner

*Primary Examiner* — Emmett K. Walsh
(74) *Attorney, Agent, or Firm* — Lindauer Law, PLLC

(57) ABSTRACT

Systems for facilitating the return of items include generating first code data associated with an order and second code data associated with an item within the order. When input data indicating the first code data is received, user interface data presenting the items associated with the order is generated. The user interface may be customized to prioritize primary characteristics of items, such as size or color of clothing items, and may be arranged to position items more likely to be returned prior to other items based on a user's previous activity. When input data indicative of the second code data is received, a return process for the item associated with the second code data is initiated. User interface data indicating the return of the item is then generated and presented. Use of code data to initiate returns may reduce the need for a user to navigate a user interface.

20 Claims, 8 Drawing Sheets

SYSTEM FOR FACILITATING RETURNS OF ITEMS

BACKGROUND

When a user purchases an item using an online store, the user is unable to directly examine the characteristics of the ordered items until the items are delivered to the user. If the user wishes to return an item, initiation of a return process may require use of a computing device and interaction with a user interface.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
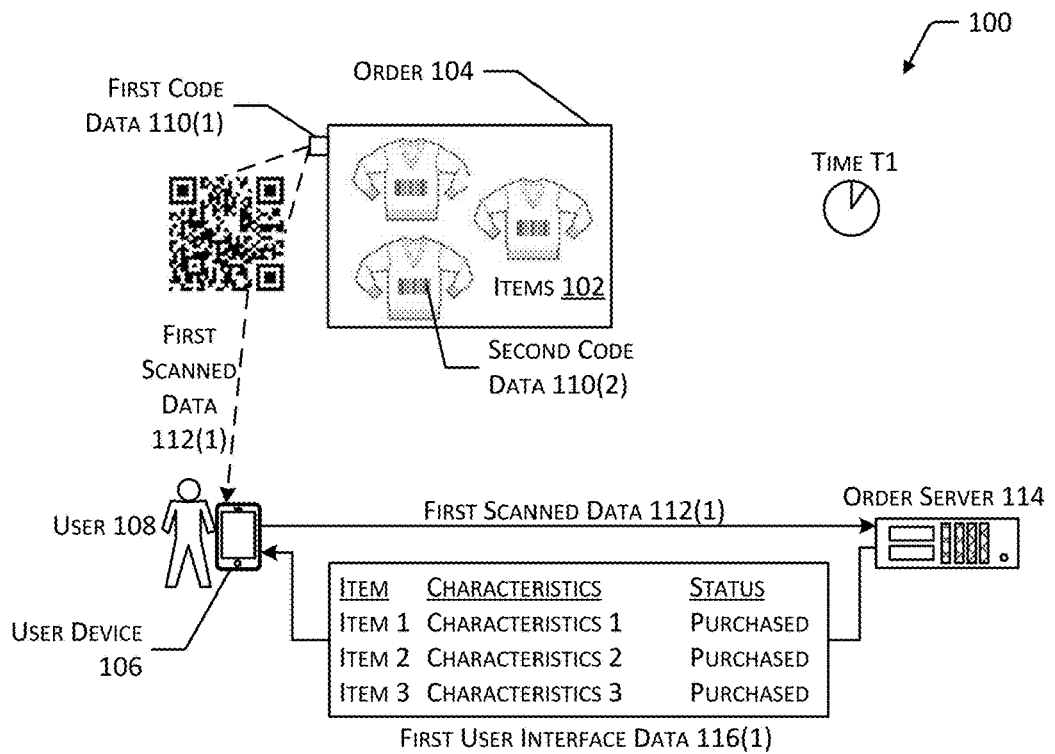
FIG. 1 depicts an implementation of a system for facilitating returns of items associated with an order using a user device having a display area of limited size.
Figure 1:
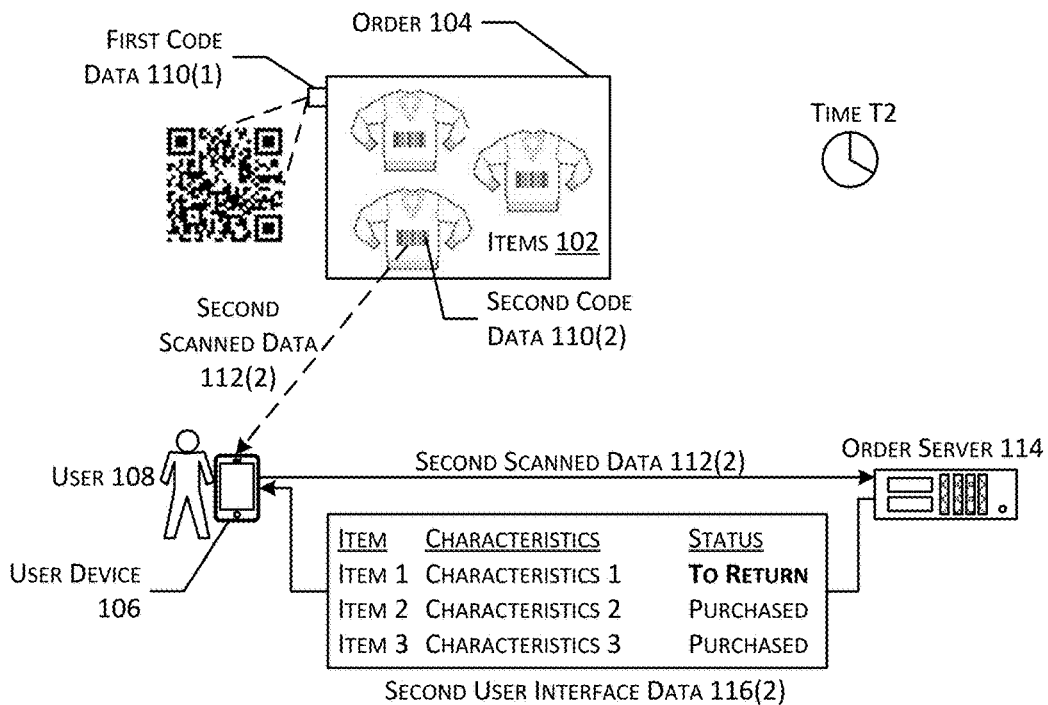

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

When an individual purchases items at a physical store or other type of brick-and-mortar location, the individual is typically able to directly examine the physical characteristics of the items. For example, when an individual purchases a clothing item at a physical store, the individual may closely examine the style, material, cut, color, and size of the clothing item, and may bring the item into a fitting room or other type of trial area to wear the item and examine the manner in which the item fits the individual's body. However, when an individual purchases items using an online store rather than traveling to a physical location, the individual typically lacks the opportunity to directly examine the items until the ordered items have been shipped to the user's address. For example, an online store may include a collection of network-accessible services executed on computer hardware that provides multiple channels through which customers, using a client computing device, may access various catalogs stored in databases to find various products and services available to purchase, lease, and so forth. Channels for accessing catalogs may include, for example, mobile applications, voice-based search programs, web pages, and so forth. Continuing the example, after receiving an ordered clothing item, an individual may determine that the appearance of the clothing item does not meet his or her needs, or the item does not properly fit the individual. The individual may then initiate a process to return the clothing item and purchase an alternate clothing item, which must then be delivered to the user's location before the user is able to examine the item. In some cases, an individual may order multiple colors or sizes of the same clothing item with the intention of returning one or more items that do not fit the individual properly or do not meet the individual's needs.

In some cases, the process for returning items purchased through an online store may be inefficient. For example, a user may wear clothing items to determine whether the items fit properly at a location that is not proximate to a computing device having a sizeable display. At a future time, the user must then access a computing device and remember which items, from among a list of similar items, did not meet the user's needs, to initiate the return process for the items. In some cases, a user may attempt to initiate a return process for clothing items while examining them, such as by using a smartphone or other type of portable computing device. However, user interfaces for return of clothing items may not be presented on a smartphone or other type of device having a display of limited size in a manner that facilitates efficient initiation of the return process. For example, when a user orders multiple similar clothing items, such as a set of dresses having the same style and sold by the same vender, in different colors and sizes, the images and titles associated with each item may be extremely similar. Continuing the example, the title for an article of clothing presented in a user interface may be a lengthy alphanumeric string that presents a manufacturer and product name prior to other information, such as the size or color of the article of clothing. An example title may be "ABC Brand Name—Woman's Sleeveless Summer Dress with Convertible Straps—Red, XX-Large". If a user were to order multiple similar articles having different colors or sizes, a user interface presenting each of these items on a smartphone may truncate the names of the items due to the limited size of the smartphone display, such that each item listed in the user interface appears identical or extremely similar. In such a case, a user may be required to interact with the user interface for a length of time to determine additional information about each item in order to identify a particular item to be returned, hindering the return process.

Described in this disclosure are techniques for facilitating returns of items that may be of particular use when initiating a return process using a portable computing device or other type of device having a display of limited size, or when initiating a return process in real time, such as while a user is wearing clothing items to determine a proper fit. When a user completes an order for one or more items, order data indicative of the item(s) may be generated. For example, order data may associate particular item identifiers for ordered items with a user account associated with the order, a location for delivery of the items, and so forth. First code data may also be generated and stored in association with the order data. The first code data may include some manner of code or input that may be provided by a user device to reference the order. Second code data indicative of a particular item within the order may be generated and also stored in association with the order data. The second code data may include a type of code or input that may be provided by a user device to reference a particular item associated with an order. For example, to initiate a return process for a particular item, a user device may be used to first provide input indicative of the first code data associated with the order, then provide input indicative of the second code data associated with the item to be returned.

In some implementations, one or more of the first code data may include a scannable code, such as a bar code or quick reference ("QR") code that may be attached to a container or packaging materials associated with the order. The second code data may similarly include a scannable code attached to packaging materials for an associated with within the order. In other cases, a scannable code may be included on a separate paper or other materials within the container associated with the order. In cases where multiple bar codes or other scannable codes are present on a container associated with an order, a particular scannable code indicative of the first code data may be labeled to facilitate identification of the code by the user. For example, a label attached to the container associated with the order may read "Scan this code to return items". Scannable codes indicative of particular items may also be labeled in a similar manner. When a scannable code is provided, a camera associated with a smartphone or other type of portable device may be used to acquire image data or another type of scanned data indicative of the code. Use of a portable computing device to acquire scanned data indicative of codes associated with the order and with particular items may enable a user to identify items to be returned and initiate a return process for such items without requiring interaction with a user interface. For example, a user may scan a bar code presented on order packaging to initiate the return process, wear a clothing item included in the order, determine that the item does not fit properly, and scan a bar code presented on the item packaging to indicate an intent to return the item. This process may enable a user to initiate returns of items in real time, such as during examination of delivered items, and may enable the user to do so without identifying specific items from among a list of items included in an order.

In other implementations, one or more of the first code data or the second code data may include a different type of code that may be efficient to input using a portable computing device. For example, the first code data or second code data may include an alphanumeric string having a limited length, such as four characters or fewer, which may enable a user to input a short code to identify a particular item for return rather than interacting with a user interface presenting a list of similar items.

In still other implementations, scanning or otherwise inputting the first code data may be used as an indication that a user is using a portable device or other type of device having a limited display area. In such, cases, in response to receiving the first code data, user interface data may be generated that prioritizes particular characteristics of the items for presentation. For example, a user interface that presents the size and color of clothing items prior to presenting other characteristics of the items, or omits presentation of other characteristics of the items, may be generated in response to receiving the first code data. The user may then provide user input via the user interface that prioritizes important characteristics of the items to select the particular item(s) to be returned. After selecting particular items to be returned, additional user interface data that indicates the returns may be generated, such as depicting returned items using a different color, font, background to indicate items for which the corresponding code data has been received. In some implementations, the user interface may be arranged based on a user's previous purchases or returns. For example, purchase history data for a user account may be accessed to determine characteristics of items that were previously returned by the user. Items having similar characteristics to those that were returned previously may be presented in the user interface prior to other items due to a greater likelihood that the user may return these items. As another example, the purchase history data may be used to determine characteristics of items that were previously purchased and not returned, and the user interface may be arranged to present items having similar characteristics prior to or subsequent to other items.

In some cases, data indicative of a return for an item may be generated only after receipt of a request from the user to process the return of the selected item(s). For example, a user may examine a portion of the items associated with an order, then provide user input requesting that the data associated with the return of the items be saved for future access, such as by selecting a "save for later" button. At a subsequent time, the user may provide input indicating an intent to continue returning items. After the user provides user input requesting processing of the returns of the items, return data indicative of a return of each of the items for which the corresponding code data was received may be provided to a computing device configured to process returns of items. In some implementations, subsequent to receipt of code data corresponding to an item, a different item having one or more different characteristics may be determined, and user interface data for presenting an offer to purchase the different item may be generated. For example, if code data for a clothing item having a particular size is received, a similar item of a different size may be determined, and a user interface offering purchase of the similar item may be presented.

As one skilled in the art will appreciate in light of this disclosure, certain embodiments may be capable of achieving certain advantages, including some or all of the following: Use of code data to indicate orders and items may enable users to indicate specific items for return, in realtime, such as while examining the items, without requiring the users to interact with user interface presenting a list of ordered items. For example, a user may scan a bar code or input a short alphanumeric string to cause a return of an item to be initiated and processed. Additionally, use of code data for an order as a trigger to generate a streamlined user interface that prioritizes particular item characteristics that may be pertinent when a user returns an item may facilitate the return process. For example, in response to receiving code data indicative of an order, a user interface that prioritizes the size and color of clothing items may be generated in lieu of a typical user interface that prioritizes an item image or title, which may enable a user to select items for return via the user interface. The user interface may also be arranged, based on a user's previous purchases and returns, to present items that are more likely to be returned, or more likely to be retained, prior to other items, further increasing the efficiency of the return process.

FIG. 1 depicts an implementation of a system 100 for facilitating returns of items 102 associated with an order 104 using a user device 106 having a display area of limited size. The system 100 is shown at a first time T1, when an order 104 is verified, and at a second time T2, when an individual item 102 is selected for return. For example, a user 108 may purchase one or more items 102 and request that the item(s) 102 be delivered to a particular location, such as a residential or business address associated with the user 108, a locker or other type of storage facility associated with the user 108, and so forth. Order data indicative of the order 104 for the purchased items 102 may be generated. An order 104 may include any number of items 102 that span any number of item types or categories. For example, FIG. 1 depicts an order 104 that includes three clothing items 102. However, in other implementations, an order 104 may include a larger or smaller quantity of items 102, as well as items 102 of different types.

After delivery of the items 102 to a selected location, the user 108 may wish to examine the items 102. For example, a user 108 receiving clothing items 102 may wish to determine whether particular clothing items 102 fit the user's body properly by wearing the items 102. At such a time, the user 108 may not necessarily be in a location proximate to a computing device having a sizeable display suitable for presentation of user interfaces listing each of the ordered items 102. For example, a user 108 may choose to try on various clothing items 102 in an isolated room of a dwelling that may not also contain a computer. If the user 108 were to determine that a particular item 102 did not fit the user 108 properly at a time that the user 108 was unable to access a computing device, the user 108 would then be required to remember the particular items 102 to be returned and interact with a computing device at a future time. However, FIG. 1 depicts the order 104 being associated with first code data 110(1), which in some implementations may include a scannable code, such as a bar code or QR code. An indication of the first code data 110(1) may be attached to or otherwise associated with a container or other packaging materials for the order 104. For example, a label presenting a QR code may be affixed to a box containing an order 104. Additionally, FIG. 1 depicts each item 102 being associated with respective second code data 110(2), which may also include a bar code or QR code associated with the respective items 102, or with packaging materials or containers for the items 102. In other implementations, one or more of the first code data 110(1) or second code data 110(2) may include other types of data, such as an alphanumeric string having a length less than a threshold length, such as four characters or fewer.

The first code data 110(1) and second code data 110(2) may enable the user 108 to initiate a return process for one or more items 102 using a portable computing device having a display of limited size, without requiring interaction with a user interface presenting the items 102. For example, the user device 106 may include a smartphone or another type of portable computing device. Due to the limited size of the display area associated with the user device 106, if the user 108 were to navigate to a website associated with the order 104 and view a list of the items 102 that were ordered, significant interaction with the user interface may be necessary to initiate a return process. Continuing the example, as described previously, if an order 104 includes multiple similar items 102, such as clothing items 102 from the same vender that are different sizes, the images and titles of the items 102 that are presented in a user interface may be identical or extremely similar. The similar content for each item 102 in a user interface may create difficulty when attempting to distinguish between individual items 102 to initiate a return process for a particular item 102. However, the user device 106 may include a camera, scanner, or other components that may enable the user device 106 to detect the first code data 110(1) and second code data 110(2). Detection of the code data 110 by the user device 106 may be used to obviate the need to interact with a user interface when initiating a return process for a particular item 102.

For example, at the first time T1, the user device 106 may be used to scan the first code data 110(1) associated with the order. The user device 106 may then transmit first scanned data 112(1) indicative of the first code data 110(1) to one or more order servers 114. While FIG. 1 depicts the order server(s) 114 as a single server, in other implementations, the order server(s) 114 may include any number and any type of computing devices including, without limitation, servers, personal computing devices, portable computing devices, automotive computing devices, wearable computing devices, set top boxes, smartphones, and so forth. The order server(s) 114 may determine correspondence between the first code data 110(1) indicated by the first scanned data 112(1) and order data indicative of the order 104. For example, when an order 104 is created, the first code data 110(1) may also be generated and stored in association with the order data indicative of the order 104. As such, the order data may identify particular orders 104 and corresponding code data 110 associated with each order 104. In response to the correspondence between the first scanned data 112(1) and the order data, the order server 114 may generate first user interface data 116(1) indicative of the items 102 associated with the order 104 that corresponds to the first code data 110(1). The order server(s) 114 may generate the first user interface data 116(1) based on the order data. The first user interface data 116(1) may be configured to cause presentation of a user interface indicating the items 102 associated with the order 104 and corresponding characteristics for the items 102. The first user interface data 116(1) may be provided to the user device 106 to cause the user device 106 to output a user interface indicative of the items 102. For example, FIG. 1 depicts the first user interface data 116(1) configured to cause presentation of an identifier for three example items 102, a set of characteristics for each of the items 102, and an indicator of a purchase or return status associated with each item 102.

In some implementations, in response to receiving first scanned data 112(1) indicative of the first code data 110(1), the first user interface data 116(1) may be arranged to prioritize particular characteristics of the items 102 and present these characteristics prior to presenting other characteristics. For example, receipt of first scanned data 112(1) may indicate that the user device 106 is a portable computing device having a display area less than a threshold size. When an order 104 includes clothing items 102, the first user interface data 114(1) may be configured to cause presentation of primary characteristics of clothing items 102, such as the size and color of each item 102, prior to presentation of other characteristics for each item 102.

At a second time T2, subsequent to the first time T1, after the first scanned data 112(1) has been received by the order server(s) 114, the user 108 may use the user device 106 to scan second code data 110(2) associated with a particular item 102 to be returned. For example, after attempting to wear a clothing item 102 and determining that the item 102 does not meet the user's needs, the user 108 may use the user device 106 to scan the corresponding second code data 110(2) for the item 102 to indicate a desire to return the item 102. Continuing the example, the second code data 110(2) may include a bar code or other type of code placed on a container or other packaging material used to transport the item 102. The user device 106 may transmit second scanned data 112(2) indicative of the second code data 110(2) to the order server(s) 114. The order server(s) 114 may determine correspondence between the second scanned data 112(2) and the order data indicative of the order 104. For example, when the order data indicative of the items 102 associated with the order 104 is generated, second code data 110(2) for each item 102 may also be generated and stored in association with the order data. As such, the order data may associate item identifiers for each item 102 with corresponding second code data 110(2). Based on the correspondence between the second scanned data 112(2) and the order data, the order server(s) 114 may initiate a return process for the particular item 102 within the order 104 that corresponds to the second scanned data 112(2).

In some implementations, the order server(s) 114 may also generate second user interface data 116(2) that indicates the return of the item 102 associated with the second scanned data 112(2). For example, the second user interface data 116(2) may be configured to cause a portion of the user interface that corresponds to the particular item 102 to be displayed in a manner that indicates the return, such as through use of particular text, a particular font, color, or other style elements, and so forth. Continuing the example, FIG. 1 depicts the second user interface data 116(2) configured to generate a user interface that identifies each item 102 within the order 104, displays a set of characteristics for each item 102, and indicates a purchase status (e.g., "purchased") or a return status (e.g., "to return") for the items 102. The return status may indicate that a return process for the item 102 has been initiated. As such, the user 108 may cause a return process for a particular item 102 to be initiated without necessarily interacting with a user interface that lists the items 102 within an order 104, by instead using the code data 110. For example, a user 108 may scan or otherwise input first code data 110(1) associated with an order 104, then scan or input second code data 110(2) associated with an item 102 to be returned, to cause a return process for the item 102 to be initiated.

Figure 2:
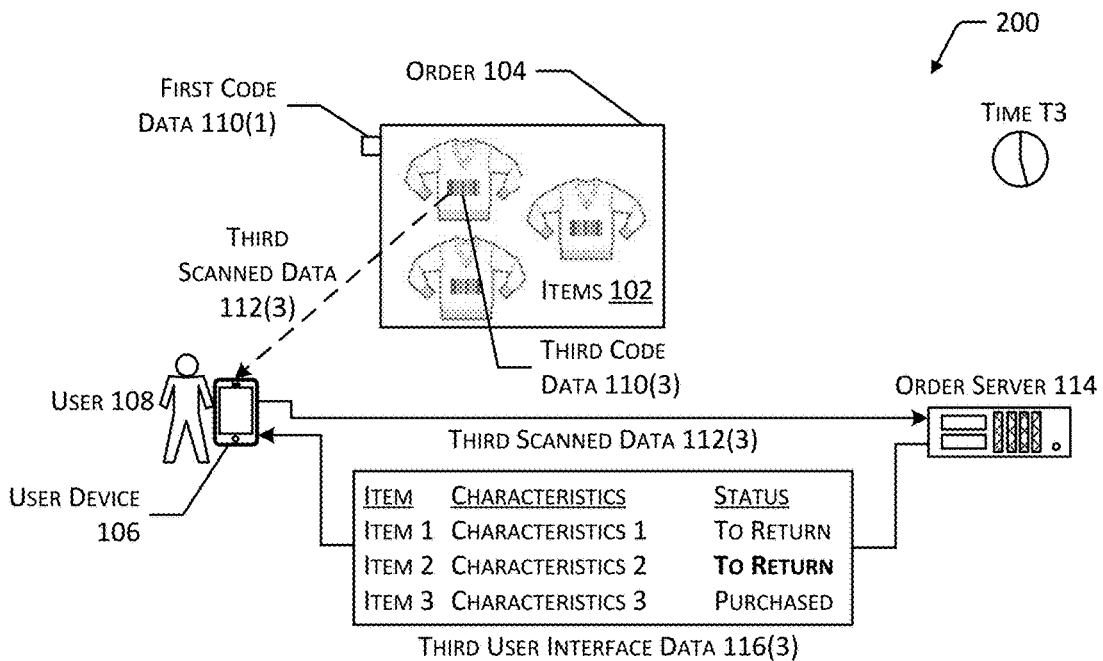
FIG. 2 depicts an implementation of a system for cancelling or completing returns of items associated with an order based on user input.
Figure 2:
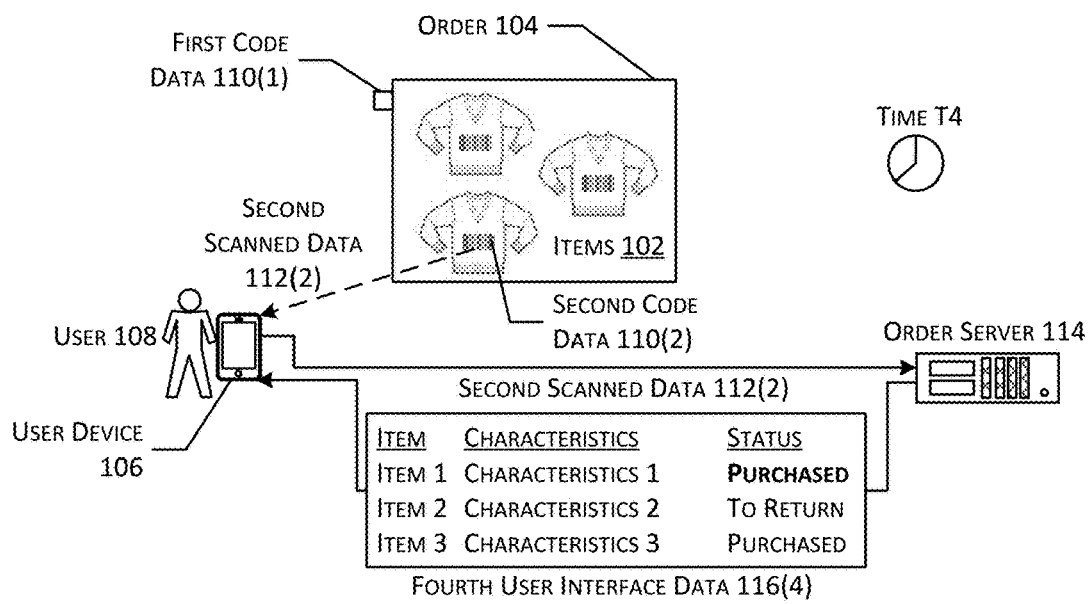
Figure 2:
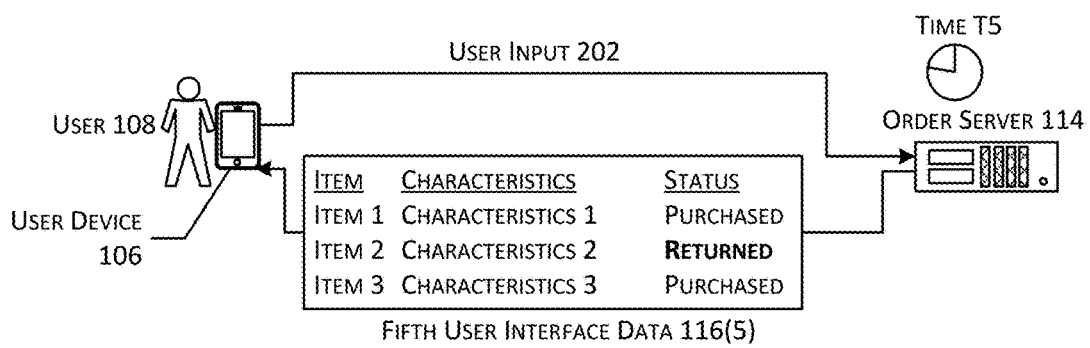

FIG. 2 depicts an implementation of a system 200 for cancelling or completing returns of items 102 associated with an order 104 based on user input 202. For example, a user may provide first scanned data 112(1) indicative of the first code data 110(1) associated with an order, and second scanned data 112(2) indicative of an item 102 within the order, as described previously with regard to FIG. 1. At a third time T3, subsequent to the second time T2 shown in FIG. 1, the user 108 may use a user device 106 to scan third code data 110(3) associated with a second item 102 within the order 104. The user device 106 may transmit third scanned data 112(3) indicative of the third code data 110(3) to the order server(s) 114. The order server(s) 114 may determine correspondence between the third scanned data 112(3) and the order data indicative of the order 104 to determine that the item 102 associated with the third code data 110(3) is included in the order 104. Based on the correspondence between the third scanned data 112(3) and the order data, the order server(s) 114 may initiate a return process for the particular item 102 within the order 104 that corresponds to the third scanned data 112(3). The order server(s) 114 may also provide third user interface data 116(3) to the user device 106. The third user interface data 116(3) may be configured to present a user interface indicating that a return process has been initiated for each item 102 for which the corresponding code data 110 has been scanned.

In some implementations, the order server(s) 114 may be configured to enable a user 108 to cancel a return process that has been initiated by scanning code data 110. For example, if a user 108 chooses to retain an item 102 for which the corresponding code data 110 has been previously scanned, the user 108 may provide additional input indicative of the item 102 to the order server(s) 114, such as by scanning the code data 110 for that item an additional time or providing input via the user interface. For example, at a fourth time T4 subsequent to the third time T3, FIG. 2 depicts the user 108 using the user device 106 to scan the second code data 112(2), which was previously scanned at the second time T2 shown in FIG. 1. The user device 106 may provide an indication of the second scanned data 112(2) to the order server(s) 114. In response to receiving input indicative of the item 102 corresponding to the second code data 110(2) again, the order server(s) 114 may cancel the previously-initiated return process for the item 102. The order server(s) 114 may also provide fourth user interface data 116(4) to the user device 106 for generation of a user interface that no longer indicates initiation of a return process for the item 102 corresponding to the second code data 110(2).

In some implementations, after a user 108 has finished examining the items 102 included in an order 104, the user 108 may provide user input 202 indicating completion of the return process. For example, the user input 202 may include a button or other feature provided via the user interface. In other implementations, the user input 202 may include scanning of specific code data 110 included with the order 104 that is used to indicate completion of the return process. In still other implementations, the user input 202 may include scanning the first code data 110(1) associated with the order 104 a second time. In response to the user input 202, the order server 114 may provide fifth user interface data 116(5) to the user device 106 for generating a user interface that indicates completion of initiation of the return process for one or more of the items 102.

Figure 3:
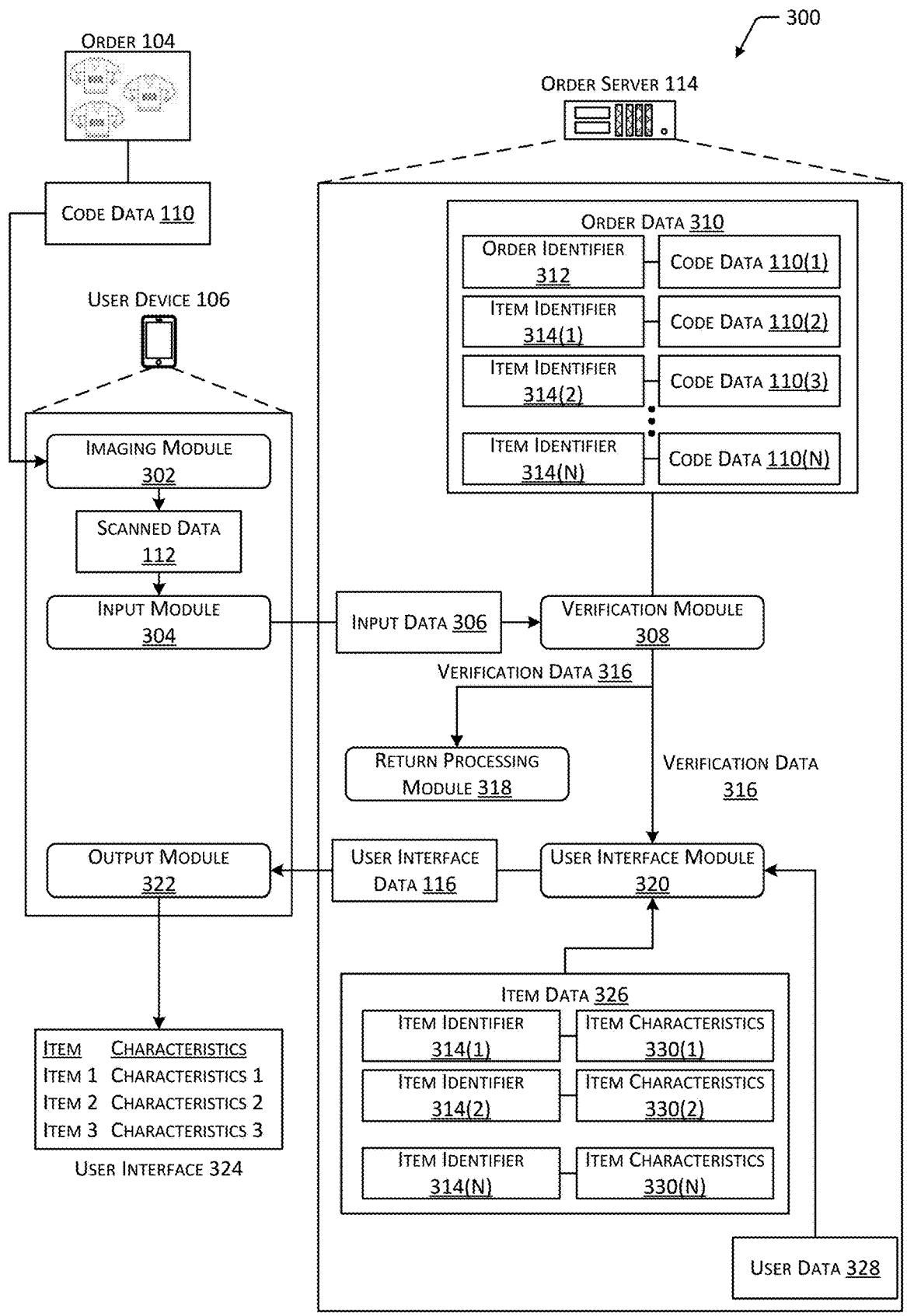
FIG. 3 depicts an implementation of a system for using code data associated with orders or items to facilitate processing of returns.

FIG. 3 depicts an implementation of a system 300 for using code data 110 associated with orders 104 or items 102 to facilitate processing of returns. As described with regard to FIG. 1, an order 104 may include one or more items 102. Respective code data 110 may be associated with the order 104, as well as with each item 102 within the order 104. For example, code data 110 may include a scannable code, an alphanumeric string, or another type of data that may be easily input using a portable computing device. Continuing the example, a smartphone or other type of portable computing device may be used to scan or acquire an image of a bar code or QR code, or to input an alphanumeric string having a length less than a threshold length. As such, FIG. 3 depicts an imaging module 302 associated with a user device 106. The imaging module 302 may be configured to cause a scanner, camera, or other type of image sensor associated with the user device 106 to detect the code data 110 associated with an order 104 or item 102. The imaging module 302 may generate scanned data 112 indicative of at least a portion of the code data 110. An input module 304 associated with the user device 106 may generate input data 306 based on the scanned data 112 and may cause the input data 306 to be transmitted to the order server(s) 114. In other implementations, the user device 106 may transmit at least a portion of the scanned data 112 to the order server(s) 114.

A verification module 308 associated with the order server(s) 114 may determine correspondence between at least a portion of the input data 306 and order data 310 indicative of the order 104. As described with regard to FIG. 1, order data 310 may associate an order identifier 312 with first code data 110(1) indicative of the order 104. The order data 310 may also include an indication of the items 102 associated with the order 104. For example, FIG. 3 depicts the order data 310 including a first item identifier 314(1) and a second item identifier 314(2) indicative of respective items 102 within the order 104. The first item identifier 314(1) is stored in association with second code data 110(2) and the second item identifier 314(2) is stored in association with third code data 110(3). As such, receipt of input data 306 from a user device 106 that corresponds to the second code data 110(2) may initiate a return process for an item 102 corresponding to the first item identifier 314(1), while receipt of input data 206 indicating the third code data 110(3) may initiate a return process for an item 102 corresponding to a second item identifier 314(2). While FIG. 3 depicts the order data 310 including item identifiers 314 and corresponding code data 110 for two items 102, the order data 310 may include any number of item identifiers 314(N) stored in association with any number of corresponding code data 110(N). Additionally, while FIG. 3 depicts the order identifier 312 and each item identifier 314 associated with a single code data 110, in other implementations, multiple codes may correspond to a single order 104 or item 102. Further, in other implementations, a single item 102 or single order 104 may have multiple corresponding item identifiers 314 or order identifiers 312. Also, while FIG. 3 depicts order data 310 representative of a single order 104, order data 310 may include any number of order identifiers 312 stored in association with item identifiers 314 indicative of the items 102 within the order 104.

If the verification module 308 determines correspondence between the input data 306 and the order data 310, verification data 316 indicative of the correspondence may be provided to a return processing module 218 to cause a return process for one or more items 102 to be initiated. Additionally, in some implementations, verification data 316 may be provided to a user interface module 320 associated with the order server(s) 114 to cause generation of user interface data 116 indicative of the order 104 or item 102 that corresponds to the scanned code data 110. If the input data 306 does not correspond to the code data 110 for an active order 104 or an item 102 within an order 104 for which the corresponding code data 110 was received, the verification module 308 may instead cause generation of a notification indicating the lack of receipt of valid code data 110.

The user interface module 320 may be configured to cause the user interface data 116 to be provided to the user device 106. Specifically, an output module 322 associated with the user device 106 may cause the user device 106 to present a user interface 324 using at least a portion of the user interface data 116. The user interface data 116 may be generated based on one or more of the order data 310, item data 326 that indicates characteristics of one or more items 102, or user data 328 associated with the user account for the order 104. For example, in some implementations, item data 326 may associate item identifiers 314 for particular items 102 within the order 104 with corresponding sets of item characteristics 330. Item characteristics 330 may include information regarding particular items 102, such as an item name, category, brand, manufacturer, vender, dimensions, material characteristics, color, size, shape, and so forth. For example, item characteristics 330 for a clothing item 102 may include an item name (e.g., "strapless woman's sundress"), an item category (e.g., "dresses"), one or more material characteristics (e.g., "90% cotton, 10% polyester"), a size (e.g., "Size 6"), a color (e.g., "Green"), and so forth. In other implementations, the order data 310 may include one or more item characteristics 330. For example, when an order 104 is generated, a particular size and color of a clothing item 102 may be selected by the user 108. The size and color may be stored in association with the item identifier 314 for the particular item 102 as part of the order data 310.

The user interface data 116 may be configured to cause presentation of a user interface 324 that indicates at least a subset of the item characteristics 330 for an item 102, as well as identifying information for the item 102. In some cases, the identifying information may include at least a portion of an item identifier 314. In other cases, the identifying information may include one or more item characteristics 330. For example, identifying information for an item 102 may include an item name or title, while the corresponding characteristics presented in the user interface 324 may include a size or color of the item 102. In still other cases, the identifying information may include a unique identifier generated in association with the order data 310. For example, an order 104 that includes seven items 102 may number the items 102 using numerals from 1 through 7, or letters from A through G. Subsequently, a user 108 may reference a particular item 102 via user input that includes the numeral or letter indicated in the order data 310.

In some implementations, the user interface data 116 may further be generated based on user data 328 for the user account associated with the order 104. For example, the user data 328 may include purchase history data indicative of previous items 102 purchased or returned by a user account. Continuing the example, the user interface module 320 may determine the item characteristics 330 for items 102 that have been previously returned and present items 102 from the order 104 that share at least a subset of the item characteristics 330 prior to presenting other items 102 due to an increased likelihood that a user 108 may return these items 102. User data 328 may also be used to determine the particular item characteristics 330 included in a user interface 324 based on a purchase history, search history, browsing history, or demographic characteristics associated with the user account.

Figure 4:
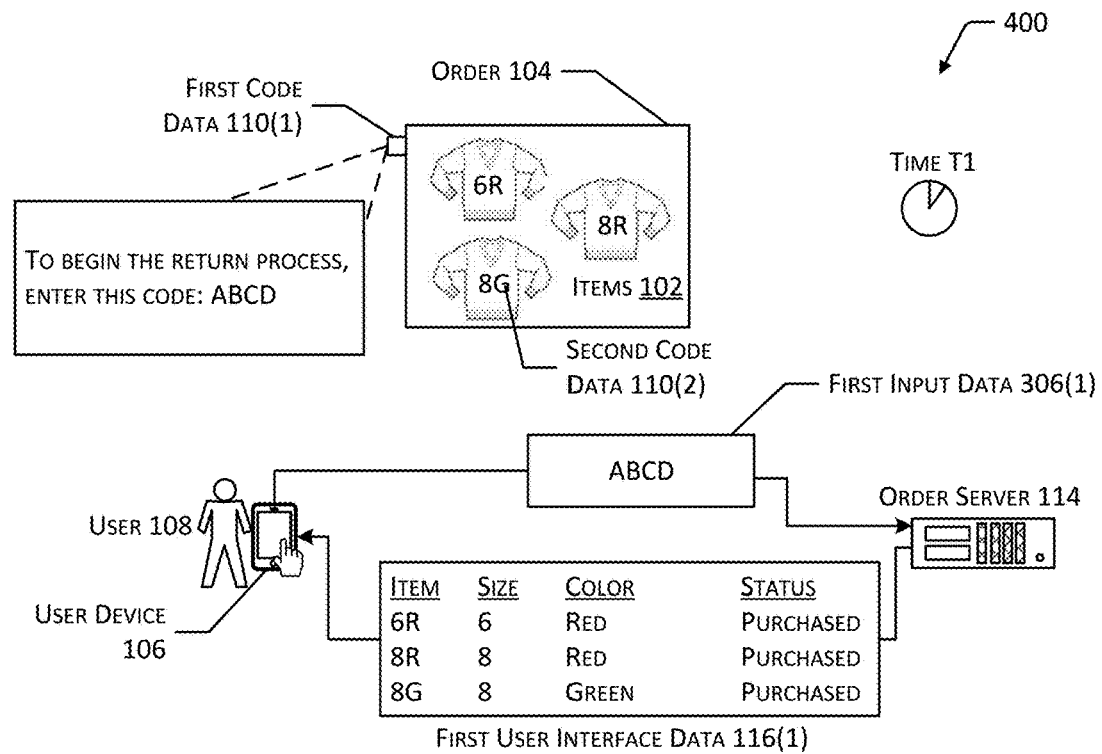
FIG. 4 depicts an implementation of a system for facilitating returns of items associated with an order using user input code data.
Figure 4:
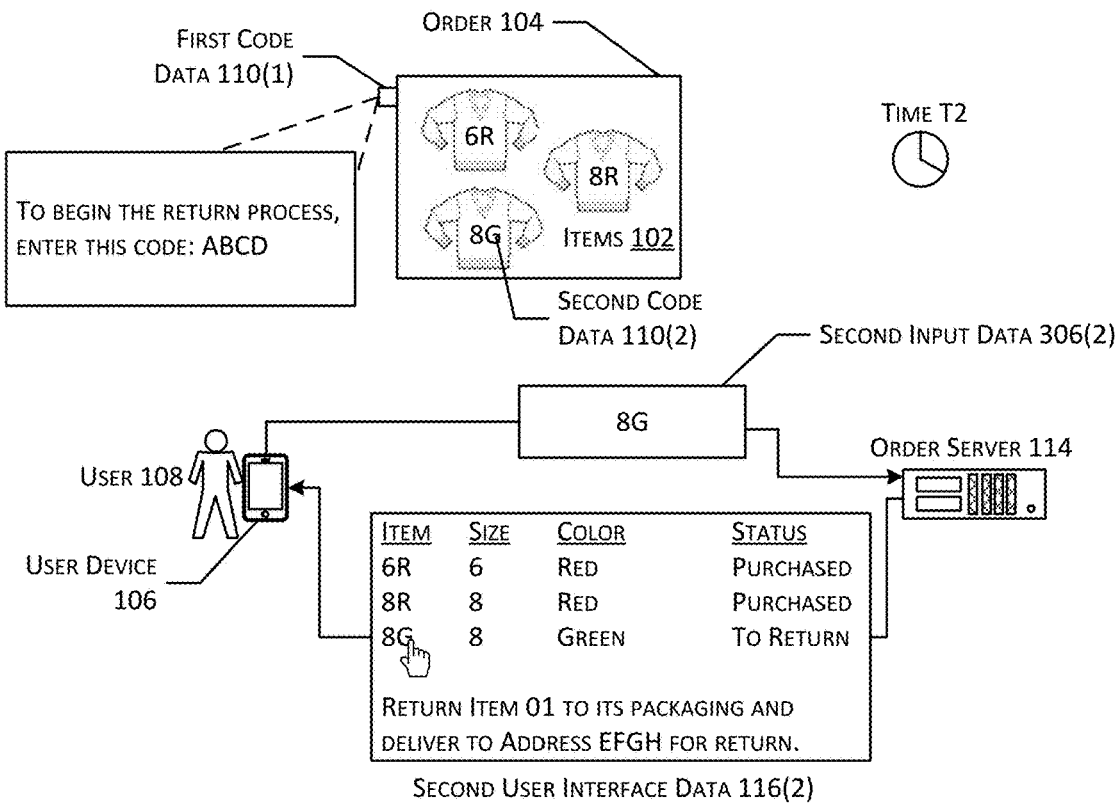

FIG. 4 depicts an implementation of a system 400 for facilitating returns of items 102 associated with an order 104 using user input code data 110. The system 400 is shown at a first time T1, when an order 104 is verified, and at a second time T2, when an individual item 102 is selected for return. As described with regard to FIG. 1, an order 104 may include one or more items 102. First code data 110(1) may be associated with the order 104, such as by including a label or other indicia on a container or packaging materials used to transport the order 104 or a paper or other material displaying the first code data 110(1) placed inside the container. Respective second code data 110(2) may be associated with each item 102 within the order. In the system 400 shown in FIG. 4, the first code data 110(1) includes an alphanumeric string having four characters: "ABCD". For example, a label or other indicia associated with the order 104 may include instructions indicating that the first code data 110(1) is to be used to initiate a return process. When a user 108 wishes to initiate the return process for one or more items 102, the user 108 may input first input data 306(1) representative of the first code data 110(1) using a user device 106. For example, the first input data 306(1) may be provided to the order server(s) 114 using an application, a web interface, a message service, e-mail, and so forth. Due to the limited length of the alphanumeric string indicated in the first code data 110(1), the first input data 306(1) may be input by the user 108 efficiently, without necessarily requiring the user 108 to interact with a user interface 324 presenting the items 102.

As described with regard to FIG. 3, the order server 114 may determine correspondence between the code indicated by the first input data 306(1) and order data 310 that associates the first code data 110(1) with an order identifier 312 indicative of the order 104. In response to the correspondence, the order server 114 may generate first user interface data 116(1) that presents an identifier for each item 102 within the order 104, one or more item characteristics 330 for each item 102, and a status indicating the purchase or return of each item 102. For example, FIG. 4 depicts each item 102 including second code data 110(2) that includes an alphanumeric string, such as a two-digit number. Because the alphanumeric string associated with each item 102 is unique within the order 104, the identifying information for each item 102 presented using the first user interface data 116(1) may include the alphanumeric string indicated by the second code data 110(2). Additionally, because the example items 102 shown in FIG. 4 include clothing items, the item characteristics 330 presented using the first user interface data 116(1) may include primary characteristics associated with clothing items 102, such as a size and color of each item 102. In some implementations, to facilitate differentiation between the items 102 within the order 104, the second code data 110(2) for one or more of the items 102 may correspond to the item characteristics 330 of the item 102. For example, the second code data 110(2) for a clothing item that is size "8" and colored red may be "8R", while the second code data 110(2) for a clothing item that is size "8" and colored green may be "8G" and the second code data 110(2) for a clothing item that is size "6" and colored red may be "6R".

At a second time T2, subsequent to the first time T1, the user 108 may indicate a particular item 102 for which to initiate a return process by providing second input data 306(2) indicative of the second code data 110(2) for that item 102 to the order server(s) 114. In some implementations the second input data 206(2) may be provided by interacting with a user interface 324 presented using the first user interface data 116(1). For example, because the user interface 324 prioritizes the presentation of item characteristics 330 that facilitate differentiation between the similar items 102 included in the order 104 and identifies each item 102 with a short, unique alphanumeric string, the user 108 may identify the particular item 102 to be returned without navigating beyond the user interface 324. Continuing the example, the user 108 may indicate a particular item 102 using a touchscreen, button, mouse device, keyboard, or similar input device to indicate a region of the user interface 324 corresponding to the item 102. In other implementations, the user 108 may provide the second input data 306(2) by inputting the alphanumeric string indicated in the second code data 110(2). For example, because each item 102 is represented by a two-digit code that is unique within the order 104, the user 108 is able to initiate the return process for an item 108 by inputting only two characters, without necessarily requiring the user 108 to interact with the user interface 324 presenting the items 102.

The order server(s) 114 may determine correspondence between the second input data 306(2) and order data 310 that indicates the second code data 110(2) corresponding to the selected item 102. In response to the correspondence, the order server(s) 114 may generate second user interface data 116(2) that indicates the initiation of the return process for the indicated item 102. For example, a user interface 324 presented using the second user interface data 116(2) may include text indicating the return of the item 102, or a particular font, color, background, or other visible indication that may differentiate an item 102 to be returned from items 102 for which a return process has not been initiated. In some implementations, the second user interface data 116(2) may also be used to present instructions to the user 108, such as instructions to place an item 102 into its packaging and transport the item 102 to a particular address to complete the return process.

Figure 5:
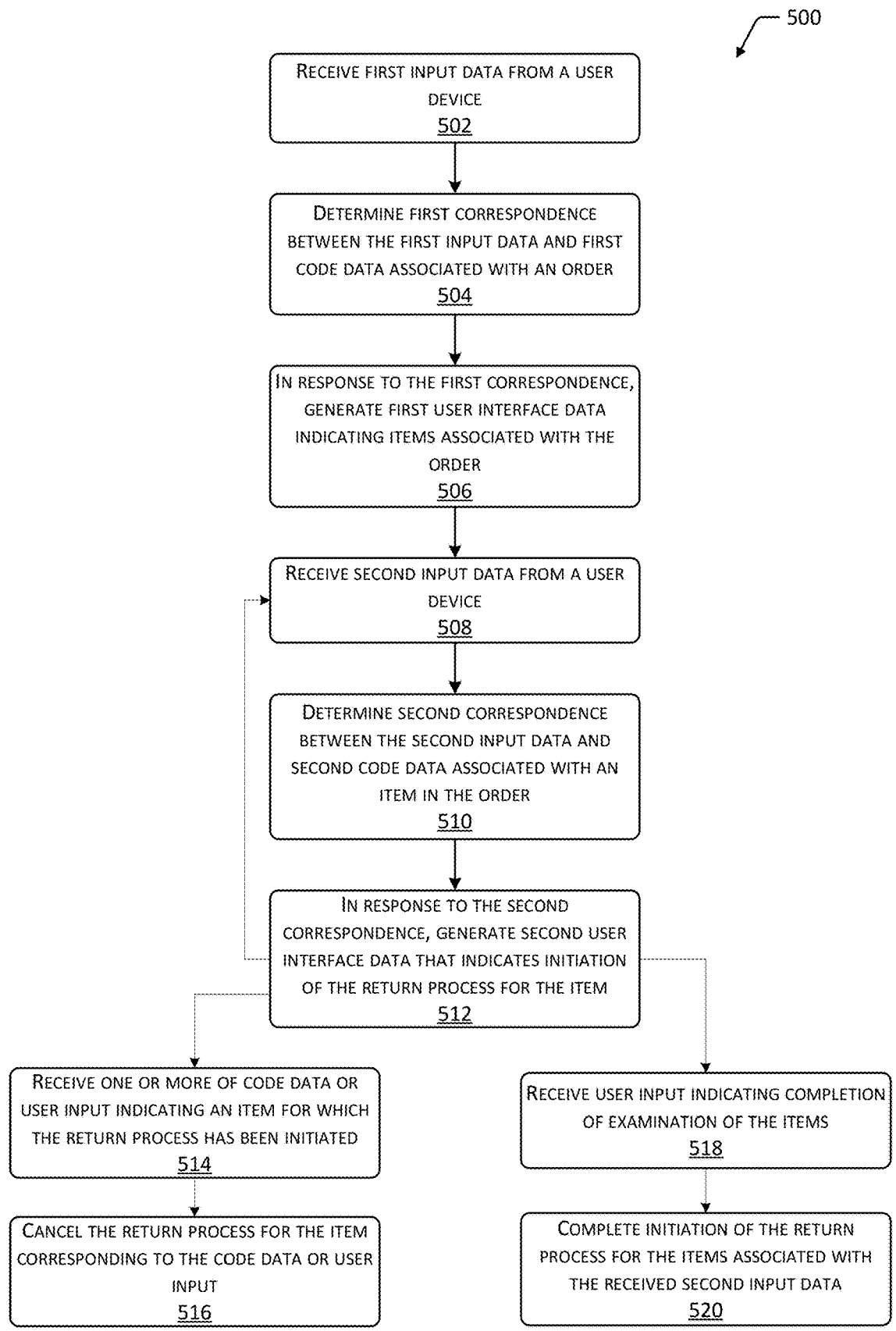
FIG. 5 is a flow diagram illustrating a method for facilitating returns of items associated with an order using code data.

FIG. 5 is a flow diagram 500 illustrating a method for facilitating returns of items 102 associated with an order 104 using code data 110. At 502, first input data 306(1) may be received from a user device 106. For example, a user device 106 may scan a code or other type of indicia associated with an order 104, or a user device 106 may be used to input an alphanumeric string or other type of data associated with the order 104. The user device 106 may transmit the input data 306 to one or more order servers 114.

At 504, first correspondence between the first input data 306(1) and first code data 110(1) associated with an order 104 may be determined. For example, when an order 104 is completed, order data 310 indicative of the order 104 may be generated. The order data 310 may include an order identifier 312 indicative of the order 104 and item identifiers 314 indicative of the items 102 associated with the order 104. When the order data 310 is generated, first code data 110(1) may also be generated and associated with the order data 310. Subsequently, when input data 306 indicative of the first code data 110(1) is received, correspondence between the input data 306 and the order data 210 may indicate the particular order 104 associated with the input data 306. If the input data 306 corresponds to an active order 104 that was delivered to a user's requested location, then the method may proceed to step 506. If the input data 306 does not correspond to an active order 104, then a notification may be provided to the user device 106 indicating that the received input data 306 is not valid.

At 506, in response to the first correspondence, first user interface data 116(1) may be generated that indicates the items 102 associated with the order 104. For example, the user interface data 116 may be generated based on the order data 310 associated with the order 104 and in some cases, based on item data 326 associated with the items 102 within the order 104. Continuing the example, the user interface data 116 may be configured to cause output of a user interface 324 that presents information indicative of an item 102 in association with one or more item characteristics 330 for the item 102. Item characteristics 330 may include, for example, size, color, dimensions, or other material qualities of an item 102, as well as a manufacturer, vender, brand, category, title, and so forth. The user interface data 116 may be provided to a user device 106 to cause presentation of a user interface 324.

At 508, second input data 306(2) may be received from a user device 106. In some implementations, the second input data 306(2) may be associated with a scannable code. In other implementations, the second input data 306(2) may include alphanumeric data or another type of data, such as audio data, image data, or video data, that is input by a user 108. The user device 106 may transmit the second input data 306(2) to the order server(s) 114.

At 510, second correspondence may be determined between the second input data 306(2) and second code data 110(2) associated with an item 102 in the order 104. For example, the order data 310 may associate item identifiers 314 for each item 102 with corresponding code data 110, such that each item 102 of an order 104 is associated with a unique code within the order 104. The second correspondence between the second input data 306(2) and the second code data 110(2) may indicate the particular item 102 that corresponds to the second input data 306(2). If the second input data 306(2) does not correspond to the code data 110 for an item 102, then a notification indicating the invalidity of the second input data 306(2) may be provided to the user device 106.

At 512, in response to the second correspondence, second user interface data 116(2) may be generated that indicates initiation of the return process for the item 102. For example, the second user interface data 116(2) may cause a portion of the user interface 324 that corresponds to the returned item 102 to be presented using a different color, font, style characteristics, or using different alphanumeric data, such as a status indicator of "returned". Use of code data 110 to cause generation of user interfaces 324 and initiation of a return process may enable items 102 to be returned without requiring a user 108 to interact with a user interface 324.

The process described with regard to 508 through 512 may be repeated for additional items 102. For example, second input data 306(2) for an additional item 102 may be received, correspondence between the second input data 306(2) and the second code data 110(2) for an item 102 within the order 104 may be determined, and additional user interface data 116 may be generated indicating initiation of the return process for each item 102 for which input data 306 is received.

In some implementations, the return process for one or more items 102 may be cancelled, such as if a user 108 decides to retain an item 102 for which a return process has been previously initiated. For example, at 514, one or more of code data 110 or user input 202 indicating an item 102 for which the return process has been initiated may be received. Correspondence between the received user input 202 or code data 110 and a particular item 102 within the order 104 may be determined. At 516, the return process for the item 102 corresponding to the code data 110 or user input 202 may be canceled. In some implementations, additional user interface data 116 indicating cancellation of the return process for the item 102 may be generated.

At 518, user input 202 indicating completion of examination of the items 102 may be received. For example, after a user 108 has determined the items 102 within an order 104 to be returned and the items 102 to be retained, the user 108 may provide user input 202 indicating completion of examination of the items. At 520, in response to the user input 202, initiation of the return process for the items 102 associated with the received second input data 306(2) may be completed. For example, the order server(s) 114 may provide data indicative of the order 104 and the item 102 to a return processing module 318 or a separate computing device to cause the return process to be initiated. In some implementations, user interface data 116 indicating completion of the return process for one or more of the items 102 may be generated.

Figure 6:
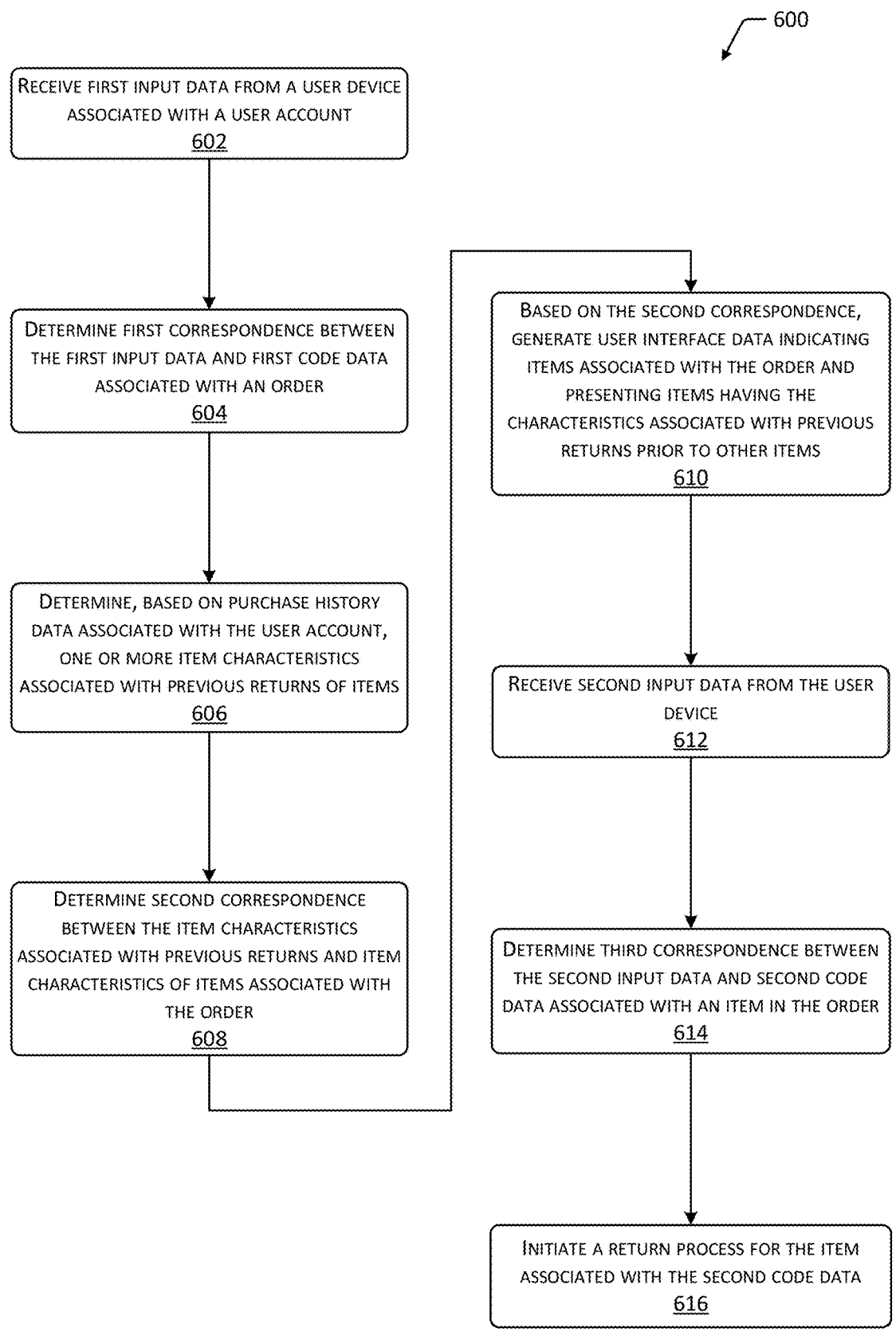
FIG. 6 is a flow diagram illustrating a method for facilitating returns of items using user interface data that presents items based on purchase history data for a user account.

FIG. 6 is a flow diagram 600 illustrating a method for facilitating returns of items 102 using user interface data 116 that presents items 102 based on purchase history data for a user account. At 602, first input data 306(1) may be received from a user device 106 associated with a user account. For example, a user account may be used to request an order 104 for one or more items 102. Order data 310 and first code data 110(1) associated with the order 104 may be generated. Subsequently, input data 306 that corresponds to at least a portion of the code data 110 may be received and used to identify a particular order 104 associated with the input data 306.

At 604, first correspondence between the first input data 306(1) and first code data 110(1) associated with an order 104 may be determined. If the first input data 306(1) received from the user device 106 corresponds to the code data 110 associated with the order data 310, the particular order 104 associated with the input data 306 may be identified. If the first input data 306(1) does not corresponds to the code data 110 for an active order 104, a notification may be provided indicating the invalidity of the input data 306.

At 606, based on purchase history data associated with the user account, one or more item characteristics 330 associated with previous returns of items 102 may be determined. For example, the purchase history data for a user account may indicate particular items 102 that were purchased and particular items 102 that were returned. The purchase history data or item data 326 indicative of the items 102 may indicate particular item characteristics 330 of items 102 associated with the user account that were previously returned.

At 608, second correspondence may be determined between the item characteristics 330 associated with previous returns and item characteristics 330 of items 102 associated with the order 104. The second correspondence may indicate particular items 102 within the order 104 that have a greater likelihood of being returned, or retained, based on the previous return or purchase behaviors associated with a user account. For example, if a user 108 has habitually purchased shirts having the same manufacturer, brand, and style in two sizes, "large" and "medium", and has returned the "medium" shirt 75% of the time, this may indicate a strong likelihood that subsequent "medium" shirts purchased by the user 108 are more likely to be returned than other items.

At 610, based on the second correspondence, user interface data 116, may be generated that indicates items 102 associated with the order 104 and presents items 102 having the characteristics associated with previous returns prior to other items. For example, a user interface 324 generated based on the user interface data 116 may present items 102 that are more likely to be returned (e.g., items 102 within the order 104 that share item characteristics 330 with items 102 that have been previously returned by a user account) in a more prominent location within the user interface 324, such as vertically above other items 102. Presentation of a user interface 324 that prioritizes certain items 102 may enable a user 108 to efficiently locate items 102 to be returned within the user interface 324 and to efficiently initiate a return process for selected items 102.

At 612, second input data 306(2) may be received from the user device 106. In some implementations, the second input data 306(2) may be received via the user interface 324, such as by selection of a region of the user interface 324 that corresponds to a particular item 102. In other implementations, the second input data 306(2) may be received by scanning or otherwise inputting data corresponding to second code data 110(2) associated with an item 102. For example, an item 102 may have a scannable code, an alphanumeric string, or another type of code attached or otherwise associated therewith. As another example, the user interface 324 may present a code or other unique identifier for each item 102. The second input data 306(2) may include data indicative of a scanned or user input code.

At 614, third correspondence between the second input data 306(2) and second code data 110(2) associated with an item 102 in the order 104 may be determined. For example, order data 310 may associate particular items 102 with corresponding code data 110. If the second input data 306(2) corresponds to the code data 110 associated with a particular item 102, the particular item 102 that corresponds to the second input data 306(2) may be determined. If the second input data 306(2) does not correspond to the code data 110 for an item 102, a notification indicating invalidity of the second input data 306(2) may be provided to the user device 106.

At 616, a return process for the item 102 associated with the second code data 110(1) may be initiated. For example, in response to the third correspondence, the particular item 102 associated with a scanned code or user input data may be determined. A return processing module 318 of the order server(s) 114 or another computing device in communication with the order server(s) 114 may initiate the return process for the item 102. As described with regard to FIG. 5, a user 108 may provide input data 306 associated with additional items 102, cancel a return process associated with one or more items 102, or provide user input 202 to complete the return process associated with the items 102 for which input data 306 has been received.

Figure 7:
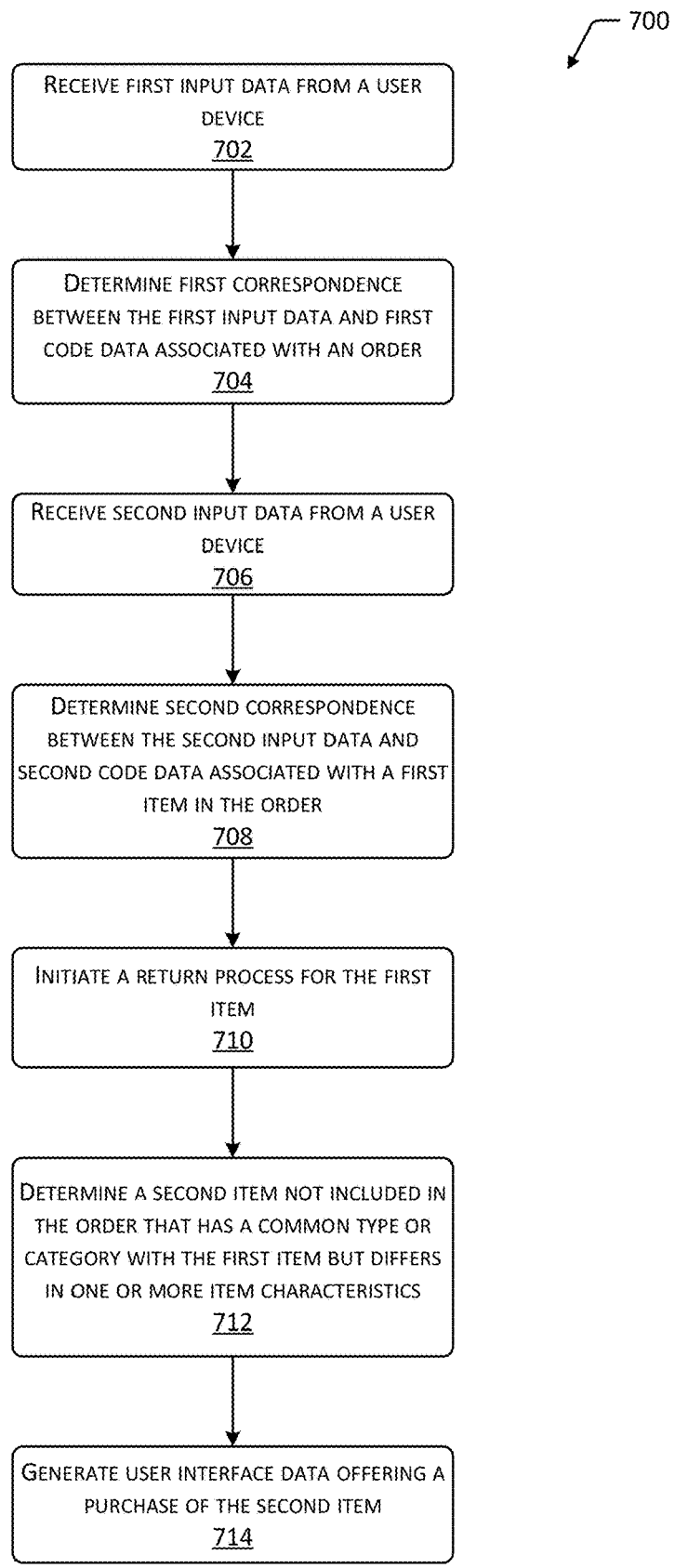
FIG. 7 is a flow diagram illustrating a method for facilitating returns of items using code data and purchases of alternate items.

FIG. 7 is a flow diagram 700 illustrating a method for facilitating returns of items 102 using code data 110 and purchases of alternate items 102. At 702, first input data 306(1) may be received from a user device 106. As described with regard to FIGS. 5 and 6, a user device 106 may be used to scan a scannable code or otherwise generate input data 306 indicative of first code data 110(1) associated with an order 104.

At 704, first correspondence between the first input data 306(1) and first code data 110(1) associated with an order 104 may be determined. For example, as described with regard to FIGS. 5 and 6, an order 104 may be associated with multiple items 102. When order data 310 indicative of the order 104 and items 102 is generated, code data 110 for the order 104 may also be generated, such that the code data 110 may be input to reference the order 104. If the received input data 306 does not correspond to the code data 110 for an active order, a notification may be generated indicating the invalidity of the input data 306. If the first input data 306(1) corresponds to the code data 110 for the order 104, this correspondence may be used to identify the particular order 104 associated with the first input data 306(1).

At 706, second input data 306(2) may be received from the user device 106. For example, as described with regard to FIGS. 5 and 6, code data 110 for each item 102 within an order 104 may be generated and stored in association with the order data 310. The code data 110 for an item 102 may then be input to reference the item 102. Correspondence between the second input data 306(2) and the code data 110 for a particular item 102 may identify the particular item 102 that a user 108 wishes to return.

As such, at 708, second correspondence may be determined between the second input data 306(2) and second code data 110(2) associated with a first item 102 in the order 104. If the second input data 306(2) does not correspond to the code data 110 for any item 102 associated with the previously determined order 104, a notification may be generated indicating the invalidity of the second input data 306(2). However, if the second input data 306(2) corresponds to a particular item 102, a return process for the particular item 102 may be initiated. For example, at 710, a return process for the first item 102 may be initiated in response to the second correspondence.

At 712, a second item 102 not included in the order 104 may be determined that has a common type or category with the first item 102, but differs in one or more item characteristics 330. As one example, the first item 102 for which the return process was initiated may include a clothing item 102 having a particular size or color. The second item 102 determined at 712 may include a clothing item 102 having the same type, and in some cases, the same brand, vender, or manufacturer, but having a different size or color.

At 714, user interface data 116 may be generated offering a purchase of the second item 102. For example, in response to a determination that the first item 102 did not meet the needs of a user 108, item characteristics 330 for the first item 102 may be determined. Then, a second item 102 having one or more differing item characteristics 330 may be offered for purchase as a replacement or alternative to the first item 102 to be returned.

Figure 8:
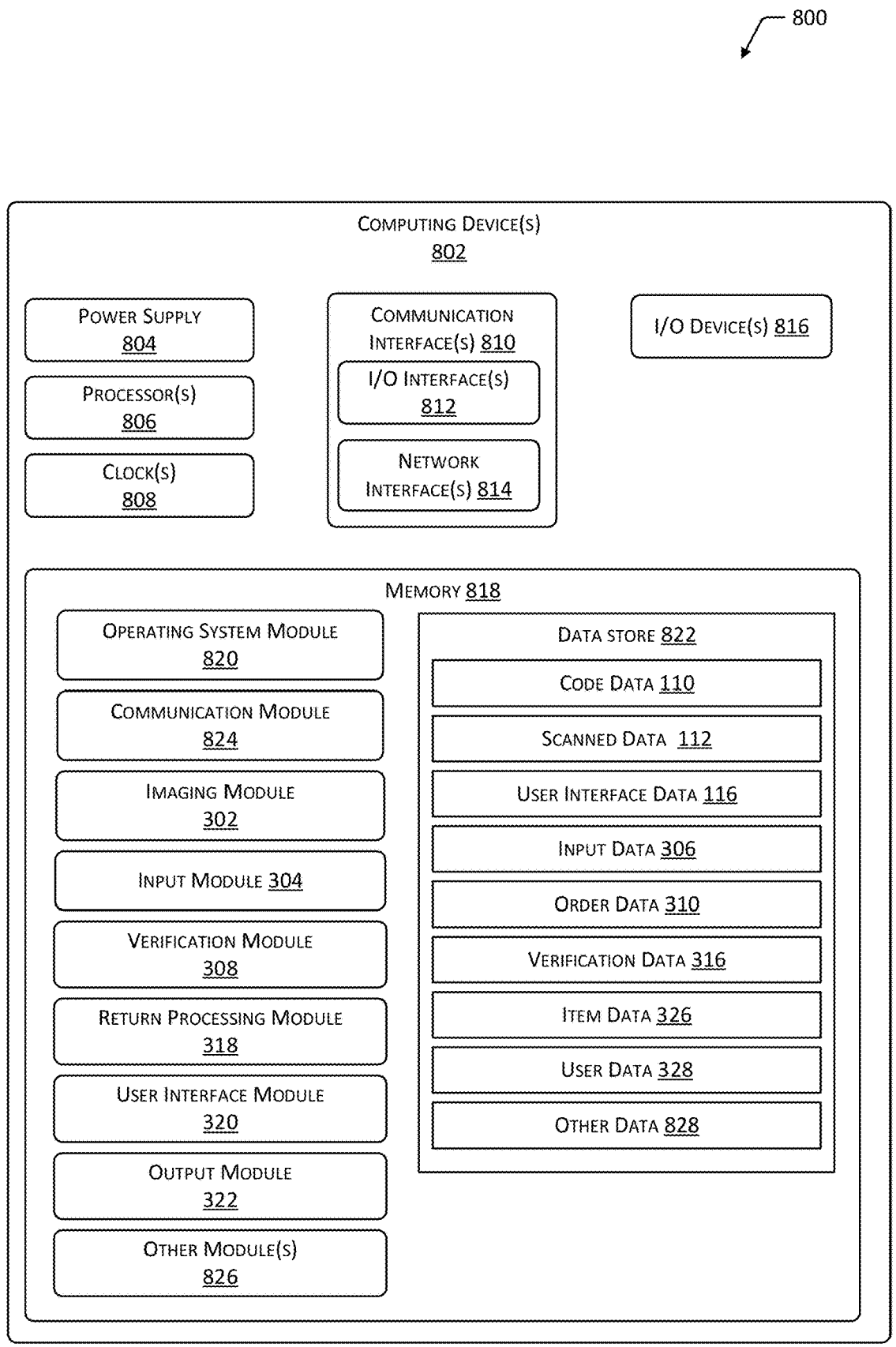
FIG. 8 is a block diagram illustrating one or more computing devices within the scope of the present disclosure.

FIG. 8 is a block diagram 800 illustrating one or more computing devices 802 within the scope of the present disclosure. While FIG. 8 depicts a single block diagram 800 indicating one or more components of the computing device(s) 802, any number and any type of computing devices may be used to perform the functions described herein. For example, the computing device(s) 802 may include one or more user devices 106, one or more order servers 114, or one or more other computing devices 802 in communication with the user device(s) 106 or order server(s) 114. Continuing the example, a user device 106 may perform a first portion of the functions described herein, then transmit data to an order server 114, which may perform a second portion of the functions described herein.

One or more power supplies 804 may be configured to provide electrical power suitable for operating the components of the computing device 802. In some implementations, the power supply 804 may include a rechargeable battery, fuel cell, photovoltaic cell, power conditioning circuitry, and so forth.

The computing device 802 may include one or more hardware processor(s) 806 (processors) configured to execute one or more stored instructions. The processor(s) 806 may include one or more cores. One or more clocks 808 may provide information indicative of date, time, ticks, and so forth. For example, the processor(s) 806 may use data from the clock 808 to generate a timestamp, trigger a preprogrammed action, and so forth.

The computing device 802 may include one or more communication interfaces 810, such as input/output (I/O) interfaces 812, network interfaces 814, and so forth. The communication interfaces 810 may enable the computing device 802, or components of the computing device 802, to communicate with other computing devices 802 or components of the other computing devices 802. The I/O interfaces 812 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 812 may couple to one or more I/O devices 816. The I/O devices 816 may include any manner of input device or output device associated with the computing device 802. For example, I/O devices 816 may include touch sensors, keyboards, mouse devices, microphones, image sensors (e.g., cameras), scanners, displays, speakers, haptic devices, printers, weight sensors, code readers, RFID devices, NFC devices, and so forth. In some implementations, the I/O devices 816 may be physically incorporated with the computing device 802 or may be externally placed.

The network interfaces 814 may be configured to provide communications between the computing device 802 and other devices, such as the I/O devices 816, routers, access points, and so forth. The network interfaces 814 may include devices configured to couple to one or more networks including local area networks (LANs), wireless LANs (WLANs), wide area networks (WANs), wireless WANs, and so forth. For example, the network interfaces 814 may include devices compatible with Ethernet, Wi-Fi, Bluetooth, ZigBee, Z-Wave, 3G, 4G, LTE, and so forth.

The computing device 802 may include one or more busses or other internal communications hardware or software that allows for the transfer of data between the various modules and components of the computing device 802.

As shown in FIG. 8, the computing device 802 may include one or more memories 818. The memory 818 may include one or more computer-readable storage media (CRSM). The CRSM may be any one or more of an electronic storage medium, a magnetic storage medium, an optical storage medium, a quantum storage medium, a mechanical computer storage medium, and so forth. The memory 818 may provide storage of computer-readable instructions, data structures, program modules, and other data for the operation of the computing device 802. A few example modules are shown stored in the memory 818, although the same functionality may alternatively be implemented in hardware, firmware, or as a system on a chip (SoC).

The memory 818 may include one or more operating system (OS) modules 820. The OS module 820 may be configured to manage hardware resource devices such as the I/O interfaces 812, the network interfaces 814, the I/O devices 816, and to provide various services to applications or modules executing on the processors 806. The OS module 820 may implement a variant of the FreeBSD operating system as promulgated by the FreeBSD Project; UNIX or a UNIX-like operating system; a variation of the Linux operating system as promulgated by Linus Torvalds; the Windows operating system from Microsoft Corporation of Redmond, Wash., USA; or other operating systems.

One or more data stores 822 and one or more of the following modules may also be associated with the memory 818. The modules may be executed as foreground applications, background tasks, daemons, and so forth. The data store(s) 822 may use a flat file, database, linked list, tree, executable code, script, or other data structure to store information. In some implementations, the data store(s) 822 or a portion of the data store(s) 822 may be distributed across one or more other devices including other computing devices 802, network attached storage devices, and so forth.

A communication module 824 may be configured to establish communications with one or more other computing devices 802. Communications may be authenticated, encrypted, and so forth.

The memory 818 may also store the imaging module 302. The imaging module 302 may be used to generate scanned data 112 indicative of code data 110 for an item 102 or order 104. For example, the imaging module may generate image data indicative of code data 110 using one or more cameras or image sensors. The code data 110 may include a scannable code, an image, alphanumeric data, or other visible elements. As another example, the imaging module may scan a bar code or QR code and generate data indicative of the scanned code. In cases where input data 306 indicative of the code data 110 is input by a user 108 use of an imaging module 302 may be omitted.

The memory 818 may additionally store the input module 304. The input module 304 may generate input data 306 based on scanned data 112 or data input by a user 108. For example, input data 306 may include data indicative of a scanned code, an image, alphanumeric data input by a user 108, alphanumeric data determined from an image through use of optical character recognition or other techniques, alphanumeric data determined from audio input through use of voice or speech recognition techniques, and so forth.

The memory 818 may also store the verification module 308. The verification module 308 may determine correspondence between input data 306 determined by one or more of the imaging module 302 or the input module 304 and order data 310 that associates code data 110 with orders 104 and items 102. Based on the correspondence between the code data 110 and the input data 306, the verification module 308 may generate verification data 316. The verification data 316 may cause generation of a notification indicating invalidity of the input data 306 if the input data 306 does not correspond to the code data 110. If the input data 306 corresponds to the code data 110, the verification data 316 may cause initiation of a return process or generation of user interface data 116.

For example, the memory 818 may store a return processing module 318 which may be configured to initiate a return process for one or more items 102 in response to one or more of the input data 306 or the verification data 316. In some implementations, the return processing module 318 may provide the verification data 316 or other data associated with the return process or the item(s) 102 to another system or computing device 702 associated with returns or purchases of items 102.

The memory 818 may also store the user interface module 320, which may generate user interface data 116 based on one or more of the order data 310, the verification data 316, and item data 326 indicative of items 102 and item characteristics 330. In some implementations, the user interface data 116 may also indicate a purchase or return status of one or more items 102, such as by indicating whether a return process for a particular item 102 has been initiated. The user interface data 116 may be configured to cause generation of a user interface 324 when output using an output device. In some implementations, the user interface data 116 may also be configured to cause output of instructions regarding return processes, or output of data relating to alternate items for purchase as described with regard to FIG. 7. The user interface module 320 may also be configured to arrange or filter the user interface data 116 based on user data 328 indicative of previous purchases, returns, or other interactions associated with a user account.

The memory 818 may additionally store the output module 322, which may be configured to output a user interface 324 based on the user interface data 116.

Other modules 826 may also be present in the memory 818. For example, encryption modules may be used to encrypt and decrypt communications between computing devices 802. Authentication modules may be used to authenticate communications sent or received by computing devices 802. Other modules 826 may also include modules for soliciting and receiving user input, settings, configurations, additional user data 328, additional item data 326, additional order data 310, and so forth. Other modules 826 may also include modules for generating order data 310, completing orders 104 and other purchase transactions, presenting information regarding items 102 and orders 104 as output, and so forth. Additionally, other modules 826 may include a module for determining, based on item data 226, particular items 102 having item characteristics 330 that are common with or that differ from item characteristics 330 of an item 102 for which a return process has been initiated. For example, as described with regard to FIG. 7, an alternate item 102 not included in an order 104 may be determined and indicated in user interface data 116 in response to initiation of a return process for an initial item 102.

Other data 828 within the data store(s) 822 may include user input data, such as configurations and settings associated with computing devices 802. Other data 828 may include encryption keys and schema, access credentials, and so forth.

In different implementations, different computing devices 802 may have different capabilities or capacities. For example, order servers 114 may have greater processing capabilities or data storage capacity than user devices 106.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet. Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
   one or more memories storing computer-executable instructions; and
   one or more hardware processors to execute the computer-executable instructions to:
     receive a request from a user device to process an order for one or more items;
     generate order data indicative of the one or more items;
     generate first code data and associate the first code data with the order;
     generate second code data and associate the second code data with a first item of the one or more items;
     cause an indication of the first code data to be included on a first container associated with the order;
     cause an indication of the second code data to be included on a second container associated with the first item;
     receive, from the user device, first scanned data indicative of the first code data;
     in response to the first scanned data, determine that a display area of the user device is less than a threshold size;
     determine first correspondence between the first scanned data and the first code data associated with the order data;
     in response to the first scanned data, determine one or more characteristics of the first item that include a first size, a first color, and at least one other characteristic;
     in response to the first scanned data and the display area of the user device being less than the threshold size, generate first user interface data indicating the one or more items, wherein the first user interface data is configured to cause the user device to present the first size associated with the first item and the first color associated with the first item prior to the at least one other characteristic of the first item;
     provide the first user interface data to the user device;
     after providing the first user interface data to the user device, receive second scanned data indicative of the second code data from the user device;
     determine second correspondence between the second scanned data and the second code data associated with the first item;
     generate first return data indicative of a return of the first item;
     generate second user interface data indicating the return of the first item; and
     provide the second user interface data to the user device.

2. The system of claim 1, further comprising computer-executable instructions to:
   generate third code data and associate the third code data with a second item of the one or more items;

receive, from the user device, third scanned data indicative of the third code data;
determine third correspondence between the third scanned data and the third code data associated with the second item;
generate second return data indicative of a return of the second item;
receive first user input data requesting processing of the return of the first item and the return of the second item; and
in response to the first user input data, cause the return of the first item and the return of the second item to be processed.

3. The system of claim 1, further comprising computer-executable instructions to:
generate third code data and associate the third code data with a second item of the one or more items;
receive, from the user device, first user input data to save the first return data in association with the order data to pause returning of items;
receive, from the user device, second user input data to continue returning of items;
receive, from the user device, third scanned data indicative of the third code data;
determine third correspondence between the third scanned data and the third code data associated with the second item;
generate second return data indicative of a return of the second item; and
include an indication of the second return data in the second user interface data.

4. The system of claim 1, further comprising computer-executable instructions to:
in response to the first scanned data, determine a second item having one or more of a second size that differs from the first size or a second color that differs from the first color, wherein the second item is not included in the one or more items;
generate third user interface data offering a purchase of the second item; and
provide the third user interface data to the user device.

5. A system comprising:
one or more memories storing computer-executable instructions; and
one or more hardware processors to execute the computer-executable instructions to:
access order data indicative of an order for a first item;
generate first code data and associate the first code data with the order data;
generate second code data and associate the second code data with the first item;
receive, from a user device, first input data indicating at least a portion of the first code data;
in response to the first input data, determine that a display area of the user device is less than a threshold size;
determine first correspondence between the first input data and the first code data associated with the order data;
in response to the first input data, determine a primary characteristic of the first item and a first alternate characteristic of the first item;
in response to the first input data and the display area being less than the threshold size, generate first user interface data to cause presentation of a first user interface that presents the primary characteristic prior to the first alternate characteristic;
after generating the first user interface data, receive second input data indicating at least a portion of the second code data;
second correspondence between the second input data and the second code data associated with the first item; and
in response to the second correspondence, generate first return data indicative of a return of the first item.

6. The system of claim 5, further comprising computer-executable instructions to:
determine a second alternate characteristic of the first item; and
in response to the first input data and determination of the primary characteristic, exclude the second alternate characteristic from the first user interface data.

7. The system of claim 5, further comprising computer-executable instructions to:
cause an indication of the first code data to be included on one or more of a container associated with the order or an object within the container associated with the order.

8. The system of claim 5, further comprising computer-executable instructions to:
cause an indication of the second code data to be included on one or more of a container associated with the first item or an object within the container associated with the first item.

9. The system of claim 5, wherein one or more of the first code data or the second code data includes an alphanumeric string having a length less than a threshold length.

10. The system of claim 5, wherein one or more of the first code data or the second code data includes a scannable code and one or more of the first input data or the second input data includes scanned data corresponding to at least a portion of the scannable code.

11. The system of claim 5, further comprising computer-executable instructions to:
determine a first characteristic and a second characteristic associated with the first item;
in response to the second input data, determine a second item having the first characteristic and lacking the second characteristic; and
generate second user interface data to cause presentation of a second user interface offering a purchase of the second item.

12. The system of claim 5, further comprising computer-executable instructions to:
receive third input data requesting processing of the return of the first item, wherein the first return data is further generated in response to the third input data.

13. A method comprising:
accessing order data indicative of an order for a first item;
generating first code data indicative of the order;
associating the first code data with the order data;
receiving, from a user device, first input data indicating at least a portion of the first code data;
in response to the first input data, determining that a display area of the user device is less than a threshold size;
determining first correspondence between the first input data and the first code data;
in response to the first input data, determining a primary characteristic of the first item and a first alternate characteristic of the first item;
in response to the first input data and the display area being less than the threshold size, generating first user interface data to cause presentation of a first user interface that presents the primary characteristic prior to the first alternate characteristic;

after generating the first user interface data, receiving second input data indicative of the first item; and in response to the second input data, generating first return data indicative of a return of the first item.

14. The method of claim 13, further comprising:

generating second code data indicative of the first item; and associating the second code data with the first item, wherein the second input data indicates at least a portion of the second code data.

15. The method of claim 13, wherein the second input data indicative of the first item is indicative of a user interaction with the first user interface associated with the first user interface data.

16. The method of claim 13, further comprising:

in response to the first input data, determining a second alternate characteristic of the first item; and in response to the first input data and the determining of the primary characteristic, excluding the second alternate characteristic from the first user interface data.

17. The method of claim 13, further comprising:

generating second code data indicative of the first item;

associating the second code data with the first item, wherein the second input data includes first scanned data indicative of at least a portion of the second code data, wherein the generating of the first return data is in response to the second code data;

after receiving the first scanned data, receiving second scanned data indicative of the at least a portion of the second code data; and in response to the second scanned data, modifying the first return data to cancel the return of the first item.

18. The method of claim 13, wherein the order further includes a second item, the method further comprising:

determining a user account associated with the order;

determining purchase history data indicative of one or more previous transactions associated with the user account;

determining, based on the purchase history data, a first value for a characteristic of the first item; and in response to the first input data, generating the first user interface data to cause presentation of the first item in the first user interface prior to the second item based on the first item being associated with the first value for the characteristic.

19. The method of claim 13, further comprising:

determining one or more of a type or a category associated with the first item;

in response to the second input data, determining a second item associated with the one or more of the type or the category, wherein the second item includes a first characteristic that differs from a second characteristic of the first item; and generating second user interface data to cause presentation of a second user interface offering a purchase of the second item.

20. The method of claim 13, further comprising:

generating second code data indicative of the first item;

associating the second code data with the first item, wherein the second input data indicates at least a portion of the second code data;

after receiving the second input data, receiving third input data that indicates the at least a portion of the second code data; and in response to the third input data, generating second return data canceling the return of the first item.

* * * * *

UNITED STATES PATENT AND TRADEMARK OFFICE
CERTIFICATE OF CORRECTION

PATENT NO. : 11,301,802 B1
APPLICATION NO. : 16/130159
DATED : April 12, 2022
INVENTOR(S) : Santiago Carnicero et al.

Page 1 of 1

It is certified that error appears in the above-identified patent and that said Letters Patent is hereby corrected as shown below:

On the Title Page

(56) References Cited:
U.S. Patent Pub. No. 2018/0158084 ("Kimmerling") is missing.
U.S. Patent Pub. No. 2019/0213608 ("Ouyang") is missing.

In the Claims

Column 22, Claim 5, Line 4:
Currently reads: second correspondence between the second input data
Where it should read: --determine second correspondence between the second input data--

Signed and Sealed this
Twenty-fourth Day of May, 2022

Katherine Kelly Vidal
*Director of the United States Patent and Trademark Office*